United States Patent [19]

Hay et al.

[11] 3,717,685

[45] Feb. 20, 1973

[54] PROCESS FOR PREPARING CHLORINATED AROMATICS

[75] Inventors: Russell G. Hay, Gibsonia; Vincent A. Notaro; Charles M. Selwitz, both of Monroeville, all of Pa.

[73] Assignee: Gulf Research & Development Company, Pittsburgh, Pa.

[22] Filed: Sept. 28, 1970

[21] Appl. No.: 76,318

[52] U.S. Cl. .........260/650 R, 260/649 R, 260/649 F, 260/649 D, 260/650 F, 260/651 R
[51] Int. Cl. .........................C07c 25/04, C07c 25/14
[58] Field of Search ....260/649, 649 F, 649 DP, 650, 260/650 F, 651

[56] References Cited

UNITED STATES PATENTS

| | | | |
|---|---|---|---|
| 3,591,644 | 7/1971 | Notaro et al. | 260/650 R |
| 3,160,653 | 12/1964 | Benning et al. | 260/650 R |
| 3,214,481 | 10/1965 | Heinemann et al. | 260/650 R X |
| 3,214,482 | 10/1965 | Caropreso et al. | 260/650 R X |
| 2,174,574 | 10/1939 | Fogler | 260/650 F |
| 3,509,204 | 4/1970 | Selwitz | 260/650 R |

*Primary Examiner*—Howard T. Mars
*Attorney*—Meyer Neishloss, Deane E. Keith and Joseph J. Carducci

[57] ABSTRACT

A process for preparing a chloroaromatic compound which involves heating an aromatic compound in the presence of a nitrate ion, a nitrite ion, NO or $NO_2$, HCl, water, oxygen, a strong acid and a paraffin or a cycloalkane.

7 Claims, No Drawings

PROCESS FOR PREPARING CHLORINATED AROMATICS

This application is directed to a process for chlorinating an alkyl aromatic while inhibiting chlorination of the alkyl side chain.

In application Ser. No. 839,042, filed July 3, 1969, now U.S. Pat. No. 3,636,170 and assigned to the same assignee as the present invention, it has been shown that a nuclear chloro or nuclear bromo aromatic compound can be prepared by heating an aromatic compound in the presence of a nitrate ion, a nitrite ion, NO or $NO_2$, a chloride ion or a bromide ion, water, oxygen and a strong acid. When an alkyl aromatic is subjected to chlorination in such system using HCl, nuclear chlorination is the predominant reaction, but there is also a tendency to chlorinate the alkyl side chain. We have found, however, that if such chlorination is effected in the additional presence of a paraffin, or a cycloalkane reduced side chain chlorination is obtained.

The alkyl aromatic hydrocarbon reactant employed herein can be one free of nuclear halogenation or one carrying a halogen (chloro, bromo, fluoro or iodo) substituent thereon. The alkyl substituent can have from one to 20 carbon atoms, preferably from 1 to 5 carbon atoms, examples of which are methyl, ethyl, n-propyl, isopropyl, isobutyl, secondary butyl, n-butyl, 3-heptyl, 1-dodecyl, 2-dodecyl, 3-dodecyl, 4-dodecyl, 1-eicosyl, etc. Examples of alkyl aromatics that can be used are toluene, ortho xylene, meta xylene, para xylene, ethyl benzene, mesitylene, pseudocumene, hemimellitene, 2-methylethylbenzene, 3-methylethylbenzene, 4-methylethylbenzene, ortho diethylbenzene, meta diethylbenzene, para diethylbenzene, cumene, ortho cymene, meta cymene, para cymene, 2-phenylbutane, 3-phenylhexane, 4-(para-methylphenyl)nonane, 1-phenylheptane, alphamethylnaphthane, beta-methylnaphthalene, 4,4'-dimethylbiphenyl, 1,4,5-trimethylanthracene, 1-phenyleicosane, etc.

Also present in the reaction system is a substance selected from the group consisting of nitrate ions, nitrite ions, NO and $NO_2$. Thus, any compound falling within the above definition or which, for example, by ionization, oxidation or disproportionation, under the reaction conditions defined herein will result in the same can be employed. By "nitrate ions" we mean to include $NO_3^-$, a singly charged anion containing one nitrogen atom and three oxygen atoms. By "nitrite ions" we mean to include $NO_2^-$, a singly charged anion containing one nitrogen atom and two oxygen atoms. Examples of compounds that can be employed include nitric acid, sodium nitrate, cesium nitrate, sodium nitrite, potassium nitrite, nitric oxide, nitrous anhydride, nitrous acid, nitrogen dioxide, nitrogen tetroxide, nitric anhydride, nitrosyl chloride, nitrosyl bromide, nitroxyl chloride, etc.

Additionally there must be present in the reaction system HCl to chlorinate the alkyl aromatic defined above, water, molecular oxygen and a strong acid. By "strong acid" we mean to include protonic acids having ionization constants at 25° C. greater than about $10^{-2}$. Such acids include perchloric acid, toluene sulfonic acid, trifluoroacetic acid, sulfuric acid, iodic acid, etc. Acids that fall outside the above definition, for example, hydrofluoric acid, phosphoric acid, boric acid, mandelic acid, benzoic acid, etc., would not be suitable for use herein.

In accordance with the discovery described and claimed herein the reaction is carried out in the additional presence of a controlled amount of a paraffin, or a cycloalkane having from five to 35 carbon atoms, preferably from five to 20 carbon atoms, in order to cut down on alkyl side chain chlorination. Specific examples of paraffins or cycloalkanes that can be used include n-pentane, isopentane, cyclopentane, methyl cyclopentane, cyclohexane, n-hexane, 3-methylpentane, n-heptane, methyl cyclohexane, cycloheptane, 2-methylhexane, 3-methylhexane, 2-methylheptane, 3-methylheptane, 4-methylheptane, n-octane, n-nonane, n-decane, n-undecane, n-dodecane, n-tridecane, n-tetradecane, n-eicosane, n-triacontane, n-pentatricontane, 4-cyclohexyltetracosane, 4-cyclohexylpentacosane, 7-cyclopentyltriacontane, etc.

The reaction defined herein is simply effected by bringing the materials together in contact with each other under specified conditions. The amount of nitrate ion, nitrite ion, No or $NO_2$ employed, on a molar basis, relative to the alkyl aromatic compound, can be from about 1:1 to about $1:10^6$, preferably from about 1:3 to about $1:10^6$. On a molar basis, relative to the alkyl aromatic compound, water can be present in the ranges of about 1000:1 to about 0.1:1, preferably about 100:1 to about 2:1. The amount of molecular oxygen that can be employed relative to the alkyl aromatic compound reactant, on a molar basis, can be from about 1000:1 to about 1:10, preferably from about 10:1 to about 1:1. The amount of strong acid employed relative to water, on a molar basis, can be from about 2:1 to about 1:20, preferably from about 1:2 to about 1:8. The amount of HCl present in the reaction system relative to the aromatic compound reactant, on a molar basis, can be from about 20:1 to about 1:20, preferably from about 6:1 to about 1:2. The amount of paraffin or cycloalkane employed relative to the alkyl aromatic compound, on a molar basis, can be from about 10:1 to about 0.1:1, preferably from about 4:1 to about 0.5:1.

the temperature employed during the process can range from about 15° to about 200° C., preferably from about 60° to about 150° C., the pressure from about 0.1 to about 10,000 pounds per square inch gauge, preferably from about ten to about 1000 pounds per square inch gauge, but most preferably from about 50 to about 150 pounds per square inch gauge, and the contact time from about 0.0001 to about 200, preferably from about one-tenth to about 10 hours.

At the end of the reaction period, the period chloro aromatic compound can be recovered from the reaction mixture in any suitable manner, for example, by phase separation and distillation at a temperature of about 50° to about 200° C. and a pressure of about 0.001 to about 10 pounds per square inch gauge. Depending upon the boiling points of the products in the reaction mixture, the individual components thereof, including the desired chloro aromatic, will come off individually overhead and can thus be easily recovered.

The process of the invention can further be illustrated by the following.

A series of runs was made in which a mixture of reactants, as set forth below in TABLE I, was heated in an atmosphere of oxygen. Upon completion of the reaction in each run the organic and aqueous phases were separated from each other, and the organic phase was analyzed by gas liquid chromatography. The results obtained are set forth below in TABLE I.

TABLE I

| Run No. | 1 | 2 | 3 |
|---|---|---|---|
| Reactants, Millimols | | | |
| Ortho Chlorotoluene | 200 | 100 | 100 |
| HCl | 200 | 200 | 200 |
| HNO₃ | 50 | 50 | 50 |
| H₂SO₄ | 592 | 592 | 592 |
| H₂O | 3580 | 3580 | 3580 |
| Cyclohexane | 0 | 100 | 0 |
| Normal Octane | 0 | 0 | 100 |
| Time, Hours | 6 | 5 | 5 |
| Temperature, °C | 80 | 80 | 80 |
| Pressure, Pounds Per Square Inch Gauge | 170 | 170 | 170 |
| * Millimols Oxygen Used | 67.4 | 43.7 | 57.6 |
| Per Cent Conversion of Ortho Chlorotoluene | 56.7 | 71.8 | 77.7 |
| Per Cent Side Chain Attack | 6.8 | 1.5 | 0.7 |
| Products, Per Cent By Weight | | | |
| Cyclohexane | 0 | 31.1 | 0 |
| Normal Octane | 0 | 0 | 34.8 |
| Chlorocyclohexane | 0 | 6.4 | 0 |
| Mono Chloro Normal Octanes | 0 | 0 | 6.5 |
| Ortho Chloro Toluene | 43.3 | 15.1 | 10.6 |
| Dichloro Cyclohexane | 0 | 4.0 | 0 |
| Nuclear Dichloro Toluene | 46.1 | 33.9 | 42.8 |
| Trichloro Cyclohexane | 0 | 1.9 | 0 |
| Dichloro Toluenes With One Chlorine On Side Chain | 4.3 | 0.7 | 0.3 |
| Other Unidentified Compounds | 0.3 | 0.5 | 0 |
| Trichloro Toluenes | 6.0 | 6.4 | 5.0 |

* Determined by pressure drop in system.

The improvement obtained by operation in accordance with the procedure defined herein can be seen from an inspection of the data in TABLE I. Note that in each of Runs Nos. 2 and 3, wherein a paraffin or cycloalkane was also present in the reaction mixture, increased conversion was obtained and with substantially less side chain attack than in Run No. 1, wherein no paraffin or cycloalkane was used.

A particularly attractive feature of the present invention occurs in the event toluene or xylenes are chlorinated in the presence of a $C_{12}$ to $C_{20}$ paraffin. The chlorinated toluene and chlorinated xylenes can easily be converted, by known hydrolysis means, to cresols and xylenols, respectively, and the chlorinated paraffins resulting are eminently suitable for alkylation of aromatics for conversion to linear alkyl benzene sulfonate detergents.

Obviously, many modifications and variations of the invention, as hereinabove set forth, can be made without departing from the spirit and scope thereof, and therefore only such limitations should be imposed as are indicated in the appended claims.

We claim:

1. A process for preparing a nuclear chloro alkyl aromatic hydrocarbon while reducing the amount of chlorination in said alkyl substituent which comprises contacting an alkyl aromatic hydrocarbon wherein the alkyl substituent has from one to 20 carbon atoms, with (1) a nitrate ion, a nitrite ion, NO or $NO_2$, (2) HCl, (3) water, (4) molecular oxygen, (5) protonic acid having an ionization constant at 25° C. greater than about $10^{-2}$ selected from the group consisting of perchloric acid, toluene sulfonic acid, trifluoroacetic acid, sulfuric acid and iodic acid and (6) a paraffin or a cycloalkene having from five to 35 carbon atoms at a temperature of about 15° to about 200° C. and a pressure of about 0.1 to about 10,000 pounds per square inch gauge for about 0.0001 to about 200 hours, wherein the amount of nitrate ion, nitrite ion, NO or $NO_2$, on a molar basis, relative to the alkyl aromatic hydrocarbon reactant, is from about 1:1 to about $1:10^6$, the molar ratio of HCl to the alkyl aromatic hydrocarbon reactant is in the range of about 20:1 to about 1:20, the amount of water, on a molar basis, relative to the alkyl aromatic hydrocarbon reactant is in the range of about 1000:1 to about 0.1:1, the amount of molecular oxygen, on a molar basis, relative to the alkyl aromatic hydrocarbon reactant, is from about 1000:1 to about 1:10, the amount of protonic acid, on a molar basis, relative to water, is from about 2:1 to about 1:20, and the amount of paraffin or cycloalkane, on a molar basis, relative to the alkyl aromatic hydrocarbon reactant is from about 10:1 to about 0.1:1.

2. The process of claim 1 wherein the temperature is in the range of about 60° to about 150° C., the pressure from about 10 to about 1000 pounds per square inch gauge, the contact time from about one-tenth to about 10 hours, the amount of nitrate ion, nitrite ion, NO or $NO_2$, on a molar basis, relative to the alkyl aromatic hydrocarbon reactant is from about 1:3 to about $1:10^6$, the molar ratio of HCl to the alkyl aromatic hydrocarbon reactant is in the range of about 6:1 to about 1:2, the amount of water, on a molar basis, relative to the alkyl aromatic hydrocarbon reactant, is in the range of about 100:1 to about 2:1, the amount of molecular oxygen on a molar basis, relative to the alkyl aromatic hydrocarbon reactant, is from about 10:1 to about 1:1, the amount of protonic acid, on a molar basis, relative to water, is from about 1:2 to about 1:8, and the amount of paraffin or cycloalkane, on a molar basis, relative to the alkyl aromatic hydrocarbon reactant, is from about 4:1 to about 0.5:1.

3. The process of claim 1 wherein normal octane employed as a paraffin.

4. The process of claim 1 wherein cyclohexane is employed as a cycloalkane.

5. The process of claim 1 wherein a nitrate ion is present and the same is obtained from $HNO_3$.

6. The process of claim 1 wherein the aromatic hydrocarbon charge is orthochlorotoluene.

7. The process of claim 1 wherein the protonic acid is sulfuric acid.

* * * * *